Dec. 21, 1965   A. D. STRUBLE, JR   3,224,697
BALLOON CABLE REELING DEVICE
Filed April 3, 1963   2 Sheets-Sheet 1

Dec. 21, 1965     A. D. STRUBLE, JR     3,224,697
BALLOON CABLE REELING DEVICE
Filed April 3, 1963                           2 Sheets-Sheet 2

United States Patent Office 3,224,697
Patented Dec. 21, 1965

3,224,697
BALLOON CABLE REELING DEVICE
Arthur D. Struble, Jr., 2101 Rosita Place,
Palos Verdes Estates, Calif.
Filed Apr. 3, 1963, Ser. No. 270,414
8 Claims. (Cl. 242—54)

This invention relates to reeling devices. More specifically this invention relates to a reeling apparatus for a cable which has a removable sheath to protect the cable from twisting or other damage as the cable is wound onto a reel and has particular application to a cable of non-circular cross section.

In balloon tethering or marine towing cables an aerodynamic or hydrodynamic cable cross section is very desirable. However, when cables formed of non-circular cross section are wound on a reel, twisting of the cable occurs. This action is accentuated if tension is present on the cable as it is wound on the drum or spool. In a cable having low crushing strength the torque forces created by twisting create either fracture or fatique which will reduce the tensile strength of the cable.

This invention has as an object the provision of a reeling device which will protect a cable from twisting by covering and supporting the cable with a protective sheath and uniformly winding the sheath covered cable on a reel.

Another object of this invention is to provide a combination reel traversing and cable-sheath enmeshing assembly.

Other objects and advantages of the present invention will suggest themselves to other applications of the invention from the following description and the appended drawings.

The invention encompasses the following features:
A reeling device for a cable with a removable protective sheath comprising:
 (a) a first reel adapted to receive said cable encased within said removable protective sheath,
 (b) a second reel positioned to receive said removable protective sheath,
 (c) means to drive said first and second reel,
 (d) a traversing assembly adapted to distribute said cable encased within said removable protective sheath uniformly along the width of said first reel,
 (e) said traversing assembly including means to channel said protective sheath around said cable as said cable is wound onto said first reel and separate said cable from said protective sheath and channel said protective sheath onto said second reel as said cable is reeled out from said first cable.

Figure 1:
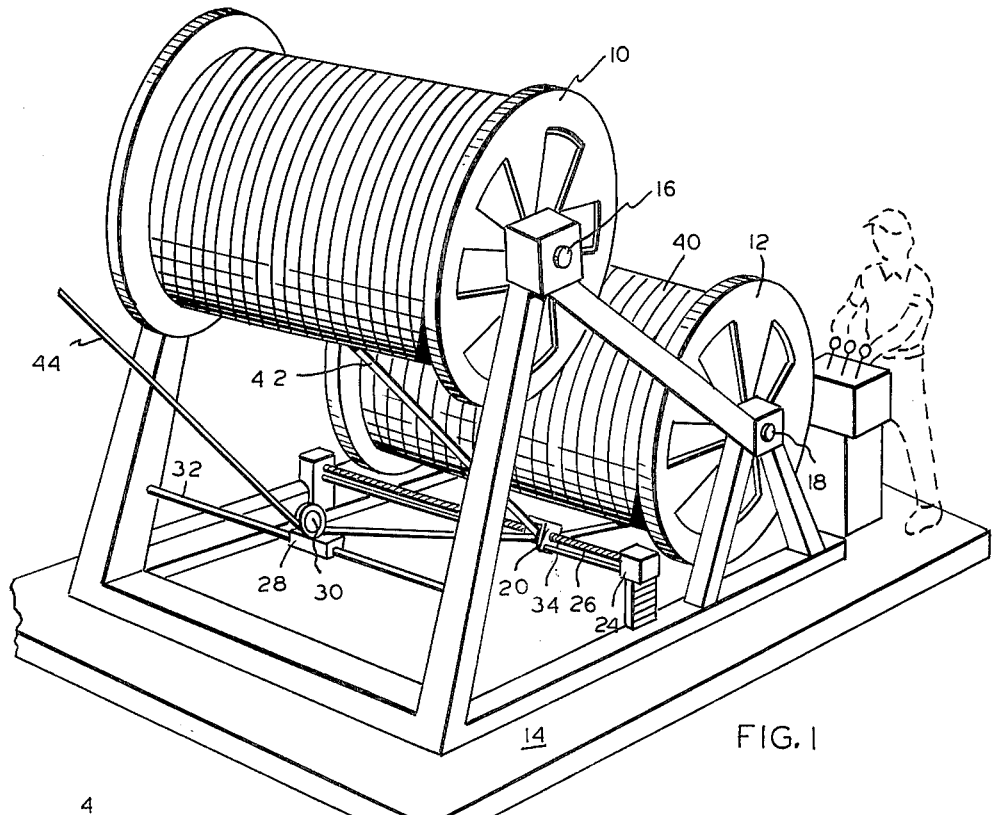
Figure 2:
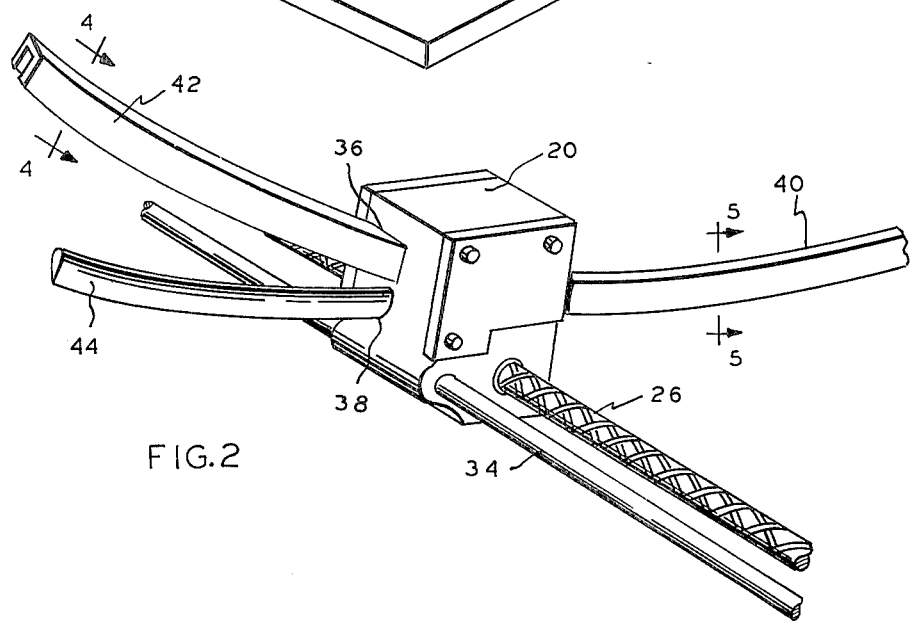
Figure 4:
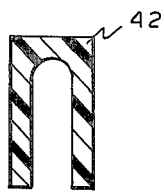
Figure 5:
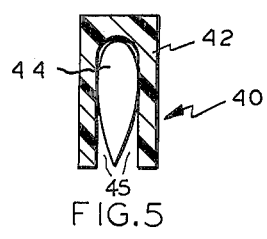
Figure 7:
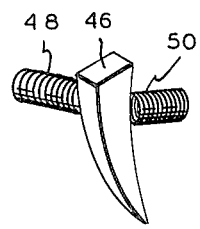
Figure 6:
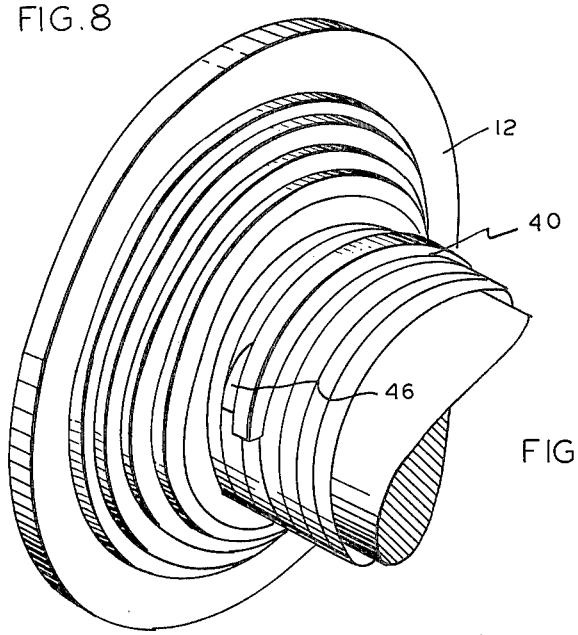

In the drawings:
FIGURE 1 is a perspective view of a balloon tethering assembly incorporating the present invention;
FIGURE 2 is a perspective view of the traversing assembly and cable sheath enmeshing means of the embodiment shown in FIGURE 1;
FIGURES 3, 4, 5, 8 and 9 show cross sections of the cable and protective sheath;
FIGURE 6 shows a detail perspective view of a reel overlay filler plug.
FIGURE 7 is a perspective view of the overlay filler plug of FIGURE 6.

Figure 3:

The invention is particularly adaptable to use with an aerodynamically shaped cable 44 as shown in FIGURE 3. A protective sheath 42 as shown in FIGURE 4 is used to encompass the cable 44 as shown in FIGURE 5. Thus, a rectangularly shaped cable assembly 40 will be wound upon a reel.

(a)

Referring to FIGURE 1, a balloon tethering arrangement is shown mounted on a base 14 which may be attached to a mobile vehicle or may be stationary. Struts attached to said base support the reeling apparatus and the cable reel.

A first reel 12 is mounted on the struts from base 14 by means of trunnions 18. Reel 12 is adapted to receive the sheath encased cable of FIGURE 5.

(b)

A second reel 10 is mounted on struts from base 14 and is supported by trunnions 16. Reel 10 is provided to receive the protective sheath 42, shown in FIGURE 4, when the cable 44 is reeled out from reel 14. For example, when a tethered balloon ascends an aerodynamically shaped tethering cable 44 of FIGURE 3 is payed out. The protective sheath 42 will be separated from the cable and wound onto reel 10. When the balloon is to be returned the cable will be drawn back to reel 12 and the protective sheath 42 will be payed out from reel 10 and reapplied to the cable as it is wound onto reel 12.

(c)

Since the sheath 42 must be taken up by the reel 10 as it is payed off the reel 12 with the cable 44, reel 10 must be provided with movement during the paying off process. For this purpose the reels 10 and 12 must have coordinated rotation. Since some means of power must be provided for reeling in the tether cable a drive means may be provided on reel 12 with a belt or other take-off drive means connected to reel 10. Electric motors, internal combustion motors and other sources of power may be suitably used to drive the reels. A reversing system is also desirable to control the rotational direction of the reels.

(d)

In order that the cable and protective sheath might be distributed properly across the face of the reel 12 and the sheath take up reel 10, a traversing assembly 20 is provided on a traverse screw 26. The traverse screw 26 is supported from the base 14 by gear boxes 22 and 24 which cause rotation of the traverse shaft screw. The traverse screw may be two way threaded with automatic reversal of the thread at its ends. The traverse screw might also be a reversably driven screw having threads in one direction only. In FIGURE 2 the traverse assembly is shown in detail. The assembly 20 is longitudinally slidable on a tension guide rod 34 and driven by a threaded attachment to traverse screw 26. The traverse screw 26 should be rotated by a drive which is coordinated with the rotation of reel 12. A geared power takeoff from reel 12 will suitably serve this purpose. However, a threaded member in the traversing assembly might be rotated by the passage of the cable through the traversing assembly to provide the drive for the traversing assembly.

As the traversing assembly 20 is moved from side to side across the face of the reel 12 the rectangular protective sheath will wind side by side across the face of the reel 12 forming a side by side arrangement of the cable encased protective sheath so that the cable is supported on the reel in a substantially uniform position with the wider front portion of the cable facing radially inward. This arrangement protects the more fragile, sharp and narrow rear portion of the cable.

(e)

The traversing assembly as shown in FIGURE 2 is provided with a Y-shaped channel which operates to control the meshing of the cable and the protective sheath in much the same manner as a zipper slide tab. The sheath encased cable 40 is payed off the roll 12 and enters a single channel on one side of the traversing assembly 20. A Y in the channel causes the sheath 40 to emerge from channel opening 36 and the cable 44 to emerge from the channel opening 38.

The continued separation of the cable and sheath is further secured as indicated in FIGURE 1 by the guide spool 30 which is slidably mounted on a shaft 32 by means of assembly 28. This arrangement holds the cable 44 down and away from the separated sheath. The guide also receives some of the tension force on the cable which would otherwise be transferred to the traversing assembly and might thereby cause greater friction on the traversing assembly and screw. Lateral force on the traversing assembly is also reduced by movement of the guide assembly 28 along the shaft 32.

When cable is payed out from the reeling device, the traversing assembly guides the cable encased sheath tangentially off the reel 12. The cable and sheath are separated as described above. The traversing assembly thus feeds the separated sheath 42 to reel 10 in a uniformly distributed manner. The cable 44 is passed under guide spool 30 and may for example extend upwardly to a tethered balloon.

Other arrangements might be used to separate the cable and sheath. For example, the "unzipping" means might be displaced from traversing assembly. However, the distinct advantage of the arrangement utilized in this embodiment is the use of a single traversing means to distribute the sheath on reel 10 as is used to distribute the sheath encased cable on reel 12.

Since it is desired that the sheath encased cable be tightly wound side by side on spool 12, spring biased plugs may be used to start the return overlay so as to prevent twisting or gaps. A spiral stepped spool end may be used as shown in FIGURE 6 with plugs 46 as shown in FIGURE 7, provided along each step. The filler plugs 46 may be spring biased upwardly and inwardly toward the cable receiving portion of the reel. As the sheath encased cable is moved against the end of the reel 12 by the traversing assembly it will bear against the filler plug 46 until the traversing assembly begins its reverse movement. The reverse movement will cause the cable to overlay the last layer and the plug 46 will fill the gap thus ensuring that twisting will not result. The uniform positioning of the sheath encased cable is the result. The upward bias of the filler plug enhances the continuance of this condition by absorbing slack in the cable.

Figure 8:
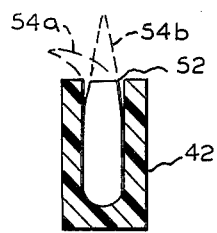

Sheath 42 is adaptable to receive various shaped cables, examples of which are described in my copending application Serial No. 270,413, filed April 3, 1963, now abandoned. In some cases, the cross section of the cable will be varied along its length. In particular, at points of juncture of two lengths of cable having different shapes or cross sectional areas, a transition portion or splice may be required. At these transition portions additional cross sectional area may be required due to reduced strength in the splice. This increased area may be provided by enlarging the cable to fill out the areas 45 in FIGURE 5. Referring to FIGURE 8, the squared rear portion of cable 52 includes within the same sheath a larger cross sectional area. If wind conditions necessitate a fully tapered rear portion, tape on other flexible material may be used to form the tail portion 54 which will assume the extended position 54b when the cable is subjected to air flow conditions but will assume form 54a or other collapsed forms when the cable is within a sheath 42 and wound on a reel. The tape 54a may thereby be compressed by a next layer of cable encased sheath which may then rest against the rear face of the sheath and the squared off portion of cable 52.

Figure 9:
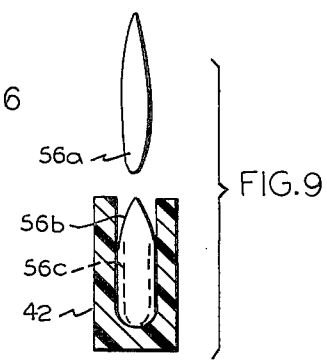

Another adaptation of the cable to fit a sheath which is uniformly shaped along its length is presented in FIGURE 9 wherein a cable 56a is shown being of smaller width than the width of sheath 42. I may desire the cable to be of the size and shape 44 shown in FIGURE 5 along one portion of its length and of the size and shape 56a shown in FIGURE 9. The same size and shape slot is desired in sheath 42 since it cannot easily be determined which length of cable will be wound on which corresponding length of sheath. Therefore, I may adapt the cable to the sheath in the following manner. The cable 56a is formed of a transversely flexible material yet retaining relatively inflexible characteristics in a longitudinal direction. This may be achieved by forming the cable of an elastic material which contains longitudinally oriented strength members. Cables of this type are fully described in my copending application Serial No. 270,413, filed April 3, 1963, now abandoned. When a cable of this type is engaged within the slot of the sheath 42 deformation of the normal cross sectional shape will occur thereby changing the shape of the cable from that illustrated by 56a and c to the shape of the slot in sheath 42 thereby assuming the configuration shown by element 56b. Of course, cables having other shapes may be constructed of suitable material allowing them to deform within the slot of a selected shape in the sheath. Such variations may occur to those utilizing the principles illustrated in this and my above mentioned copending application.

The balloon tethering system thus described is an embodiment of the present invention but modifications and variations of the reeling device might be made or adapted to other purposes. It is understood that such changes might be made without departing from the scope of the invention and would thus be embraced by the appended claims.

What is claimed is:
1. A reeling device for a cable with a removable protective sheath comprising:
 (a) a base,
 (b) a first reel mounted on said base adapted to receive said cable encased within said removable protective sheath,
 (c) a second reel mounted on said base adapted to receive said removable protective sheath with the cable removed therefrom,
 (d) means to drive said first and second reel,
 (e) a traversing assembly mounted on said base and adapted to distribute said cable, within said removable protective sheath, uniformly along the width of said first reel,
 (f) said traversing assembly including means to channel said protective sheath around said cable as said cable is wound onto said first reel and separate said cable from said protective sheath and channel said protective sheath onto said second reel as said cable is reeled out from said first cable.

2. A device according to claim 1 wherein said traversing assembly comprises a guide member threadably mounted on a reversibly driven threaded screw.

3. A device according to claim 1 wherein said traversing means comprises a driven threaded screw, a tension bar parallel to said traversing means, a cable guide member slidably mounted on said tension bar and threadably attached to said driven threaded screw.

4. A device according to claim 1 wherein said means to channel said protective sheath around said cable as said cable is wound onto said first reel and separate said cable from said protective sheath and channel said protective sheath onto said second reel as said cable is reeled out from said first cable comprises a Y-shaped passage through a traverse assembly guide member.

5. A reeling device for a cable with a removable protective sheath comprising:
 (a) a first reel adapted to receive a cable encased within a removable protective sheath,
 (b) a second reel adapted to receive said removable protective sheath with the cable removed therefrom,
 (c) means to separate said removable protective sheath from said cable,
 (d) means to guide said cable encased within said removable protective sheath to and from said first reel and to guide said removable protective sheath with the cable removed to and from said second reel.

6. A method of protecting a cable of noncircular cross section comprising:
  (a) feeding a rectangular protective sheath around said cable,
  (b) guiding said cable within said sheath uniformly onto a reel, and
  (c) removing said sheath from said cable as said cable is removed from said reel.

7. A reeling device for a cable with a removable protective sheath comprising:
  (a) a base,
  (b) struts supported by said base,
  (c) a first reel mounted on said struts adapted to receive said cable encased within said removable protective sheath,
  (d) a second reel mounted on said struts adapted to receive said removable protective sheath with the cable removed therefrom,
  (e) means to drive said first and second reels,
  (f) a traversing assembly mounted on said base and adapted to distribute said cable within said removable protective sheath uniformly along the width of said first reel,
  (g) said traversing assembly including means to channel said protective sheath around said cable as said cable is wound onto said first reel and separate said cable from said protective sheath and channel said protective sheath onto said second reel as said cable is reeled out from said first cable,
  (h) means to guide said cable, with said removable protective sheath removed, as said cable is reeled out from said reeling device.

8. In combination with a cable to be wound on a reeling device, a sheath adapted to protect a cable of non-circular cross-section comprising a flexible rectangular casing having a channel in one face thereof, said channel having dimensions corresponding to the cable whereby the cable will be substantially encompassed within said channel in order that the cable and protective sheath may be properly and evenly distributed as it is wound onto the reeling device.

References Cited by the Examiner
UNITED STATES PATENTS

| | | | |
|---|---|---|---|
| 2,344,490 | 3/1944 | Brach | 242—54 |
| 2,954,118 | 9/1960 | Anderson | 206—59 |
| 2,989,259 | 6/1961 | Youhouse et al. | 242—54 |

MERVIN STEIN, *Primary Examiner.*